US012579305B2

(12) United States Patent
Alphin, III et al.

(10) Patent No.: US 12,579,305 B2
(45) Date of Patent: Mar. 17, 2026

(54) DATA SECURITY FOR MACHINE LEARNING SYSTEMS

(71) Applicant: Microsoft Technology Licensing, LLC, Redmond, WA (US)

(72) Inventors: Thomas Henry Alphin, III, Kirkland, WA (US); Christophe Alain Berthoud, Seattle, WA (US); Agueda Sanchez, Seattle, WA (US); Vaheeshta Shereen Mehrshahi, Redmond, WA (US); Charlie Lertlumprasert, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 55 days.

(21) Appl. No.: 18/417,201

(22) Filed: Jan. 19, 2024

(65) Prior Publication Data

US 2024/0427928 A1 Dec. 26, 2024

Related U.S. Application Data

(60) Provisional application No. 63/522,390, filed on Jun. 21, 2023.

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01)

(58) Field of Classification Search
USPC .......................................................... 726/26
See application file for complete search history.

(56) References Cited

U.S. PATENT DOCUMENTS

| | | | |
|---|---|---|---|
| 2015/0269391 A1 | 9/2015 | Ukil | |
| 2022/0114325 A1* | 4/2022 | Salehian | G06F 40/216 |
| 2022/0255760 A1* | 8/2022 | Fung | H04L 63/10 |
| 2022/0300650 A1* | 9/2022 | Ekambaram | G06N 3/088 |
| 2023/0070950 A1* | 3/2023 | Matsuoka | G06F 9/5027 |
| 2023/0289560 A1* | 9/2023 | Li | G06Q 30/0201 |

OTHER PUBLICATIONS

International Search Report and Written Opinion received for PCT Application No. PCT/US2024/033478, mailed on Oct. 10, 2024, 14 pages.
International Preliminary Report On Patentability received for PCT Application No. PCT/US2024/033478, mailed on Jan. 2, 2026, 07 pages.

* cited by examiner

*Primary Examiner* — Sanchit K Sarker
(74) *Attorney, Agent, or Firm* — Shook Hardy & Bacon L.L.P.

(57) ABSTRACT

The technology described herein provides a system and method for securely managing information provided to a machine-learning system. In particular, the machine-learning system may determine that additional user data will improve the accuracy of a task being performed for a user. Security is improved by only requesting access to additional user data after determining that already available data may produce a task response that does not meet quality criteria. Further, the technology determines and requests a limited amount of user data and/or access needed to complete a task successfully. Several methods of determining whether additional user information will improve the task response are contemplated.

19 Claims, 10 Drawing Sheets

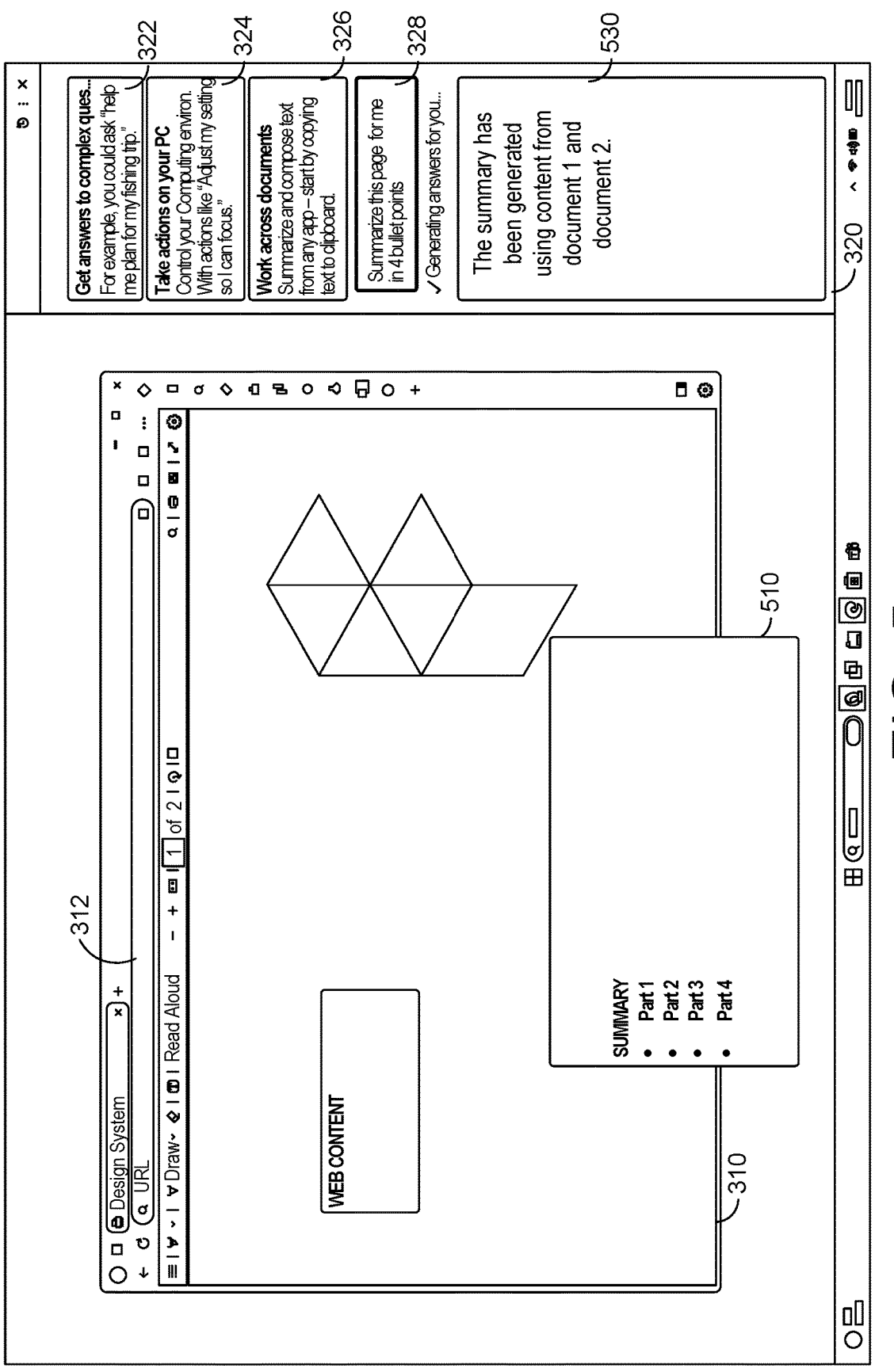

322 Get answers to complex ques...
For example, you could ask "help me plan for my fishing trip."

324 Take actions on your PC
Control your Computing environ. With actions like "Adjust my setting so I can focus."

326 Work across documents
Summarize and compose text from any app – start by copying text to clipboard.

328 Summarize this page for me in 4 bullet points
✓ Generating answers for you...

530 The summary has been generated using content from document 1 and document 2.

312    Design System    URL    Read Aloud    Draw    1 of 2    WEB CONTENT

SUMMARY
- Part 1
- Part 2
- Part 3
- Part 4

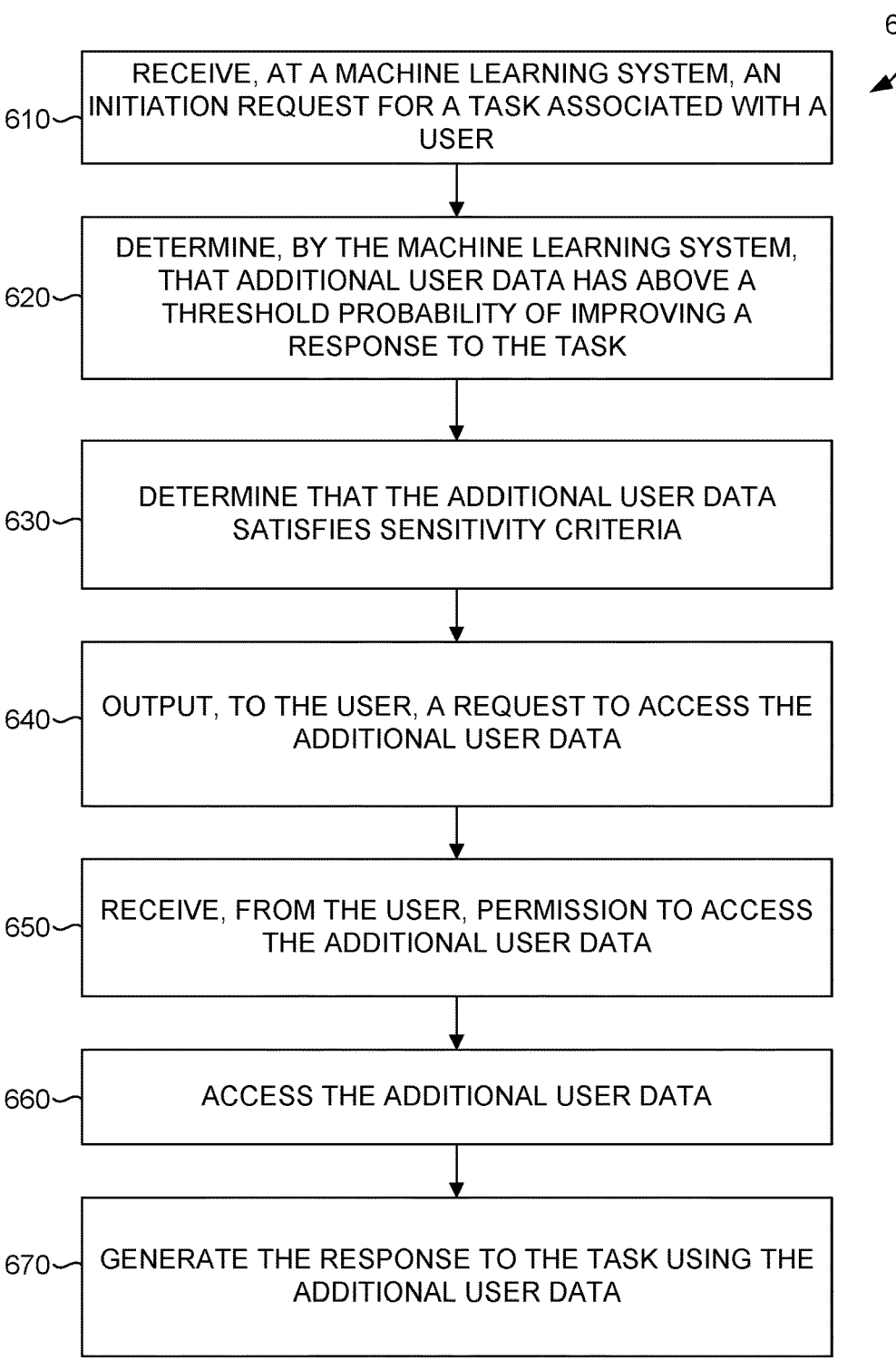

600

610 — RECEIVE, AT A MACHINE LEARNING SYSTEM, AN INITIATION REQUEST FOR A TASK ASSOCIATED WITH A USER

620 — DETERMINE, BY THE MACHINE LEARNING SYSTEM, THAT ADDITIONAL USER DATA HAS ABOVE A THRESHOLD PROBABILITY OF IMPROVING A RESPONSE TO THE TASK

630 — DETERMINE THAT THE ADDITIONAL USER DATA SATISFIES SENSITIVITY CRITERIA

640 — OUTPUT, TO THE USER, A REQUEST TO ACCESS THE ADDITIONAL USER DATA

650 — RECEIVE, FROM THE USER, PERMISSION TO ACCESS THE ADDITIONAL USER DATA

660 — ACCESS THE ADDITIONAL USER DATA

670 — GENERATE THE RESPONSE TO THE TASK USING THE ADDITIONAL USER DATA

FIG. 6

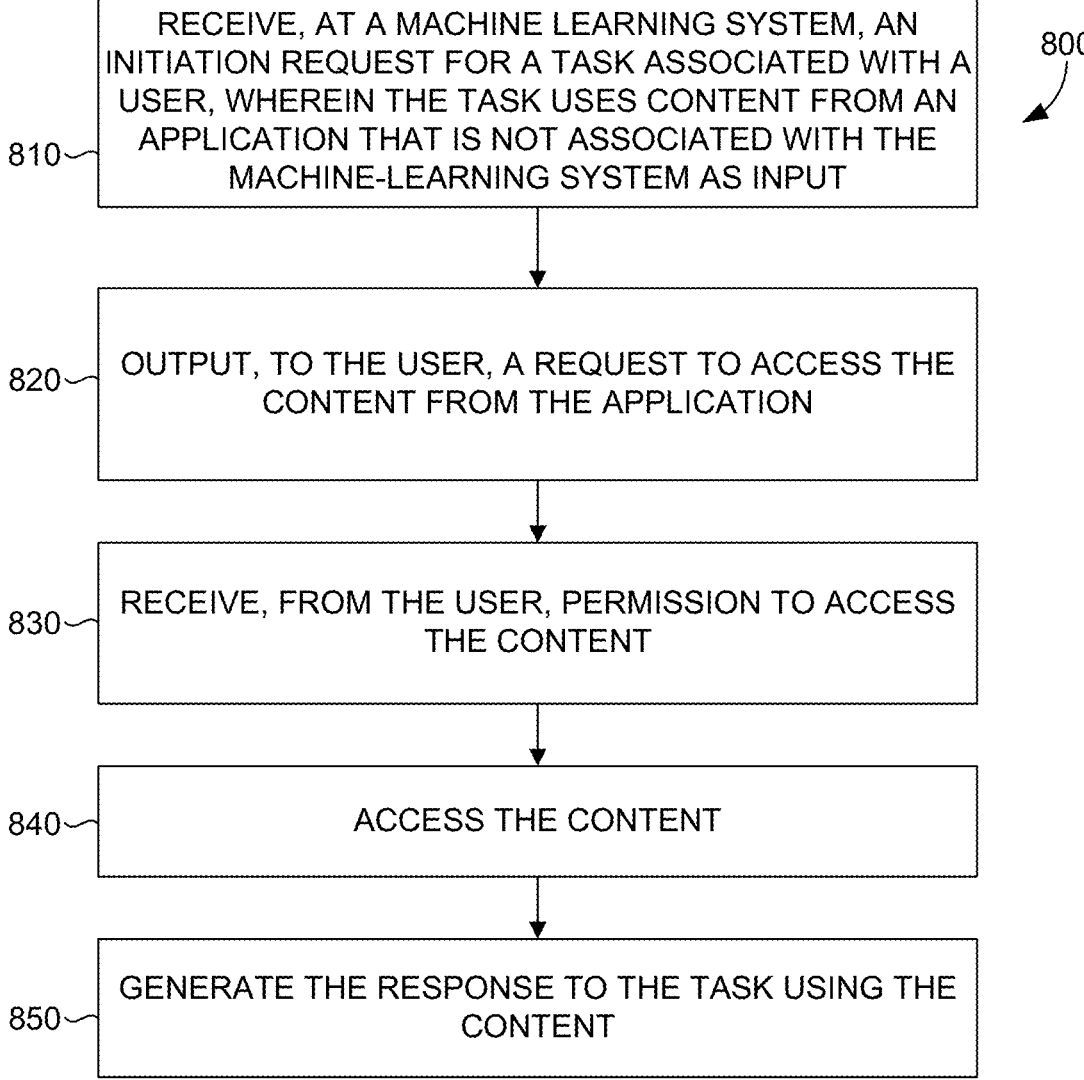

810 — RECEIVE, AT A MACHINE LEARNING SYSTEM, AN INITIATION REQUEST FOR A TASK ASSOCIATED WITH A USER, WHEREIN THE TASK USES CONTENT FROM AN APPLICATION THAT IS NOT ASSOCIATED WITH THE MACHINE-LEARNING SYSTEM AS INPUT

800

820 — OUTPUT, TO THE USER, A REQUEST TO ACCESS THE CONTENT FROM THE APPLICATION

830 — RECEIVE, FROM THE USER, PERMISSION TO ACCESS THE CONTENT

840 — ACCESS THE CONTENT

850 — GENERATE THE RESPONSE TO THE TASK USING THE CONTENT

DATA SECURITY FOR MACHINE LEARNING SYSTEMS

CROSS-REFERENCE TO RELATED APPLICATIONS

This application claims the benefit of U.S. Provisional Application No. 63/522,390, filed Jun. 21, 2023, the entirety of which application is hereby incorporated by reference.

BACKGROUND

Machine-learning and/or artificial intelligence systems require access to information sources to complete tasks. For example, a machine-learning system needs access to a group of emails to complete a summary of the emails. In other cases, access to contextual information, such as a user contact list or calendar application, will improve the accuracy of a task result. Once the information passes from the original source (e.g., contact list) to the machine-learning system, the information is at risk of being accessed through the machine-learning system or otherwise misused. At times, the information may pass from the original source to the machine-learning system without the user's knowledge or consent. There is a need for improved management of user data provided to a machine-learning system.

SUMMARY

This summary is provided to introduce a selection of concepts in a simplified form that is further described below in the detailed description. This summary is not intended to identify key features or essential features of the claimed subject matter, nor is it intended to be used in isolation as an aid in determining the scope of the claimed subject matter.

The technology described herein provides a system and method for securely managing information provided to a machine-learning system. The security may be enhanced by contextually obtaining permission from the user to access personal data before it is provided to the machine-learning system. In particular, the machine-learning system may determine that additional user data will improve the accuracy of a task being performed for a user. Additional user data is data that is not already available to the machine-learning system. Already available data may include public data and user data the machine-learning system is already authorized to access. Data not falling into these two categories may be considered additional user data.

Data security and user privacy is improved by only requesting access to additional user data after determining that already available data may produce a task response that does not meet quality criteria. Further, the technology determines and requests a limited amount of user data and/or access to complete a task successfully. The technology also determines and requests access to the user data for a specified duration that may be controlled/approved by the user. The additional information may be retrieved upon receiving permission from the user. The additional information may then be used to complete the task for the user. Further, the additional user data may be limited to data related to providing a relevant task response.

Several methods of determining whether additional user information will improve the task response are contemplated. One method is to ask the machine-learning system whether additional information will improve a quality of the task response. Another method is to let the machine-learning model generate a response to the task using available information and then evaluate the quality of the response. Another method is to train a second machine-learning model to determine whether additional information will improve a response quality.

BRIEF DESCRIPTION OF THE DRAWINGS

Aspects of the disclosure are described in detail below with reference to the attached drawing figures, wherein:

FIG. 5 is a diagram of a machine-learning interface for outputting a task result, according to an aspect of the present disclosure;

FIG. 6 is a flow chart showing a method of managing input to a machine-learning system, according to an aspect of the present disclosure;

FIG. 8 is a flow chart showing a method of managing input to a machine-learning system, according to an aspect of the present disclosure;

DETAILED DESCRIPTION

Figure 1:
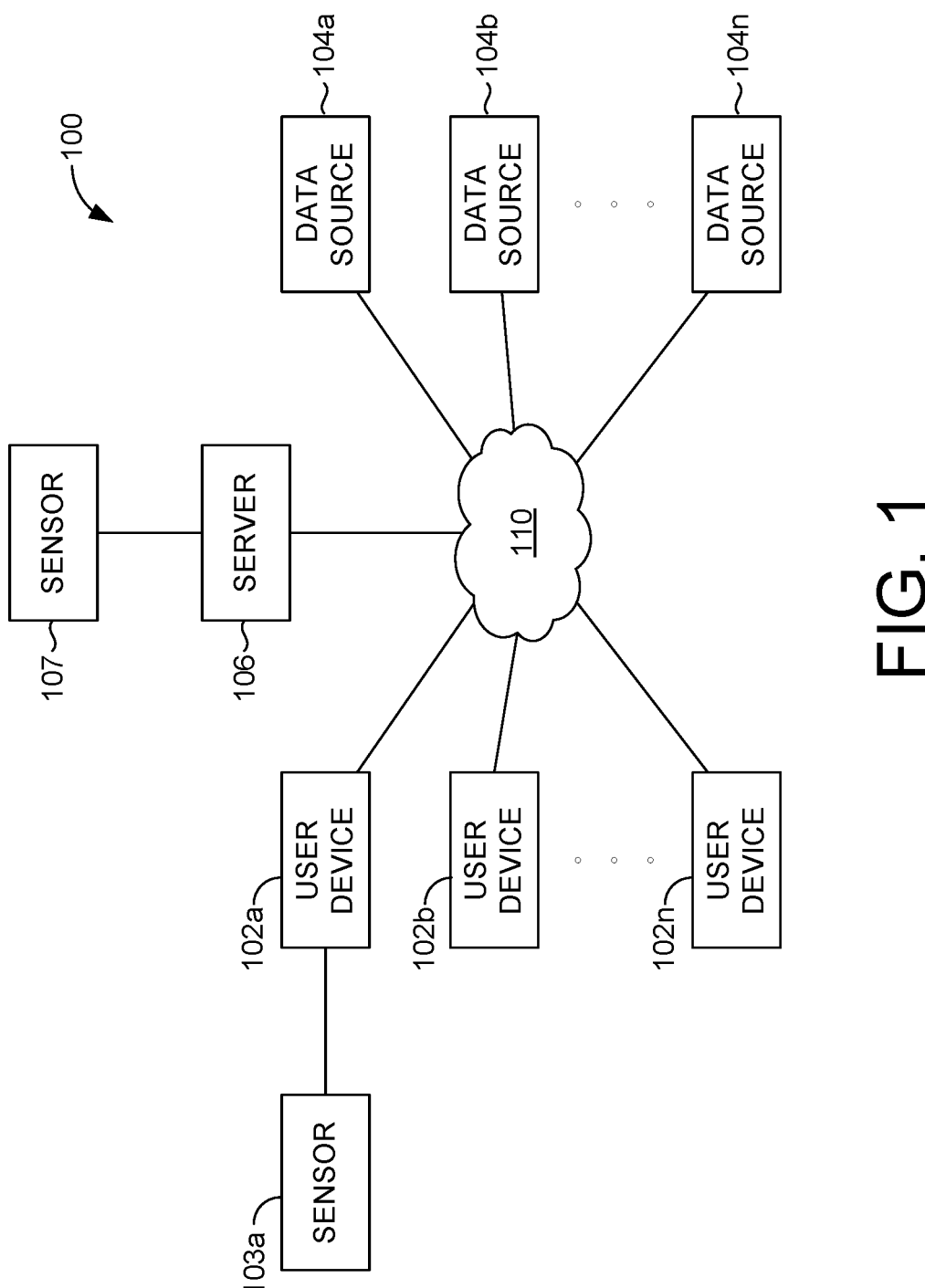
FIG. 1 is a block diagram of an example operating environment suitable for implementations of the present disclosure.

The aspects of the present disclosure are described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides a system and method for securely managing information provided to a machine-learning and/or artificial intelligence (hereinafter, collectively "machine learning") system. The security may be enhanced by contextually obtaining permission from the user to access personal data before it is provided to the machine-learning system. In particular, the machine-learning system may determine that additional user data will improve the accuracy of a task being performed for a user. Additional user data is data that is not already available to the machine-learning system. Already available data may include public data and user data the machine-learning system is already authorized to access. Data not falling into these two categories may be considered additional user data. Further, the additional user data may be limited to data related to providing a relevant task response.

Data security and user privacy are improved by only requesting access to additional user data after determining that already available data may produce a task response that does not meet a quality criteria. Further, the technology determines and requests a limited amount of user data and/or access to complete a task successfully. The technology also determines and requests access to the user data for a specified duration that may be controlled/approved by the user. The additional information may be retrieved upon receiving permission from the user. The additional information may then be used to complete the task for the user.

As an example of requesting a limited scope of user data, the machine-learning system may determine that access to additional emails may produce a more accurate summary of a plurality of emails the machine-learning system was asked to summarize. Instead of requesting access to a user's email system or inbox, the machine-learning system may generate a request to access emails to or from email addresses associated with the plurality of emails. Further, the duration may be specified as one time access because the permission request is task specific. In other words, the group of requested emails is unlikely to help the machine-learning system complete other tasks. In contrast, if the requested additional information is likely to help with other tasks, then the requested duration may be longer, such as a month or year.

As mentioned, user privacy and data security are improved when the machine-learning system seeks permission from a user to access new and relevant user data and/or a new and relevant source of user data. This permission request involves the user in securing his or her user data. The permission request makes it easy for the user to manage permissions. The permission request also educates the user about how user data is being used. The permission request describes the user data to be accessed. The permission request also may explain why the response generated by a machine-learning system would benefit from the additional user data.

In one aspect, a sensitivity analysis is performed to determine whether the additional information requested may be categorized as sensitive. In an aspect, the permission request is only generated when the additional information is categorized as sensitive. Limiting permission requests to information the user (or people in general) is likely to consider sensitive may enable the user to spend more time considering whether to grant an individual permission request. If permission requests are frequently generated, the user may simply grant requests without giving them careful consideration.

Several methods of determining whether additional user information will improve the task response are contemplated. The methods may be used individually or in combination. One method is to ask the machine-learning system whether additional information will improve a quality of the task response. The machine-learning system may be questioned using an automatically generated prompt. The prompt may be automatically generated using a natural language processor that re-phrases the task request and asks about additional information. The prompt may also ask for a specific description of the information that will improve the quality of the task response. The prompt may ask for a limited description that attempts to describe information that will help improve the quality of the response without including significant amounts of information that will not help with the response.

Another method is to let the machine-learning model generate a response to the task using available information and then evaluate the quality of the response. In one aspect, the machine-learning model generates a quality measure with each response. The confidence factor may be used as a quality measure. When the quality measure (e.g., confidence factor) falls below a threshold range, then additional information may be sought.

Another method is to train a second machine-learning model to determine whether additional information will improve a response quality. Poor quality task requests may correlate to poor quality task responses generated by the language model. The second machine-learning model may be trained using labeled task requests. The task requests may be labeled as needing additional information or adequate. If needing more information, then the label may specify a category of additional information that may help. In this way, the second machine-learning model may be able to determine when additional information will improve a task response.

In one aspect, the machine-learning system accesses information across applications. For example, the user may request a summary of a webpage being displayed. Even though this webpage may not be sensitive, the machine-learning system may request access to the browser content (e.g., the web page), file content, or application in order to complete the task. In this case, the permission request may be a reminder to the user that the content is being taken from the browser, file content, or application to the machine-learning system. The access request gives the user an opportunity consider whether the newly requested information is sensitive and reconsider a previously granted consent.

In aspects, granting the permission request is not necessary for the machine-learning system to access the user data from a technology standpoint or to comply with consent policies. In other words, in aspects the machine-learning system has access to the information (e.g., does not need a password or other credential to access) and user consent to access the content, but the machine-learning system nevertheless restricts itself from accessing information until the user grants explicit permission to do so for the purpose of completing a particular task(s). For example, a machine-learning system may have been given security access and consent to access to a group of documents previously. Upon undertaking a task to summarize one of the documents, the machine-learning model may request consent to access additional related documents from the group of documents to improve the summary. The additional consent request notifies the user that information from additional documents may be in the summary, if the request is granted. The user can then consider how the summary should be shared or stored according to any privacy concerns the user may have.

A goal of the technology described herein is to both improve user privacy and communicate to the user how their information is being used in order to build user confidence. As an improvement over past methods, the machine-learning model may engage in a consent dialogue with the user. The machine-learning model may be trained to make sure consent is obtained to comply with various best practices and legal regulations. For example, the machine learning system could be trained to emphasize transparency by being clear and open about how the personal information is going to be used. The dialog generated by the machine-learning model can provide task-specific explanations of proposed data use that were not previously possible. Further, while links to various privacy policies may be provided, the machine-learning model can reference or explain specific portions of policies in response to a user query, such as, "how long will this information be retained?"

In one example, a "sensitivity policy" refers to at least one of a corporate, organizational, enterprise, state, federal sensitivity policy, privacy regulations in different geopolitical regions, or any suitable set of rules defining management of information.

ADDITIONAL DESCRIPTION OF THE EMBODIMENTS

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. Each of the components shown in FIG. 1 is implemented via any type of computing device, such as computing device 900 illustrated in FIG. 9, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 900 in FIG. 9. For instance, server 106 is provided via multiple devices arranged in a distributed environment that collectively provides the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

In some embodiments, user devices 102a and 102b through 102n comprise any type of computing device capable of use by a user. For example, in one embodiment, user devices 102a and 102b through 102n are the type of computing device 900 described in relation to FIG. 9. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, data sources 104a and 104b through 104n comprise data sources and/or data systems, which are configured to make data available to any of the various constituents of operating environment 100 or system 200 described in connection to FIG. 2. In aspects, the technology described herein may seek permission from a user to access a data source to complete a task more accurately. For instance, one or more data sources 104a and 104b through 104n provide (or make available for accessing) user data to data collection component 210 of FIG. 2. Certain data sources 104a and 104b through 104n are discrete from user devices 102a and 102b through 102n and server 106 or are incorporated and/or integrated into at least one of those components. In one embodiment, one or more of data sources 104a and 104b through 104n comprise one or more sensors, which are integrated into or associated with one or more of the user device(s) 102a, 102b through 102n or server 106. Examples of data made available by data sources 104a and 104b through 104n are described further in connection to communication data collection component 210 or storage 225 of FIG. 2.

Figure 2:
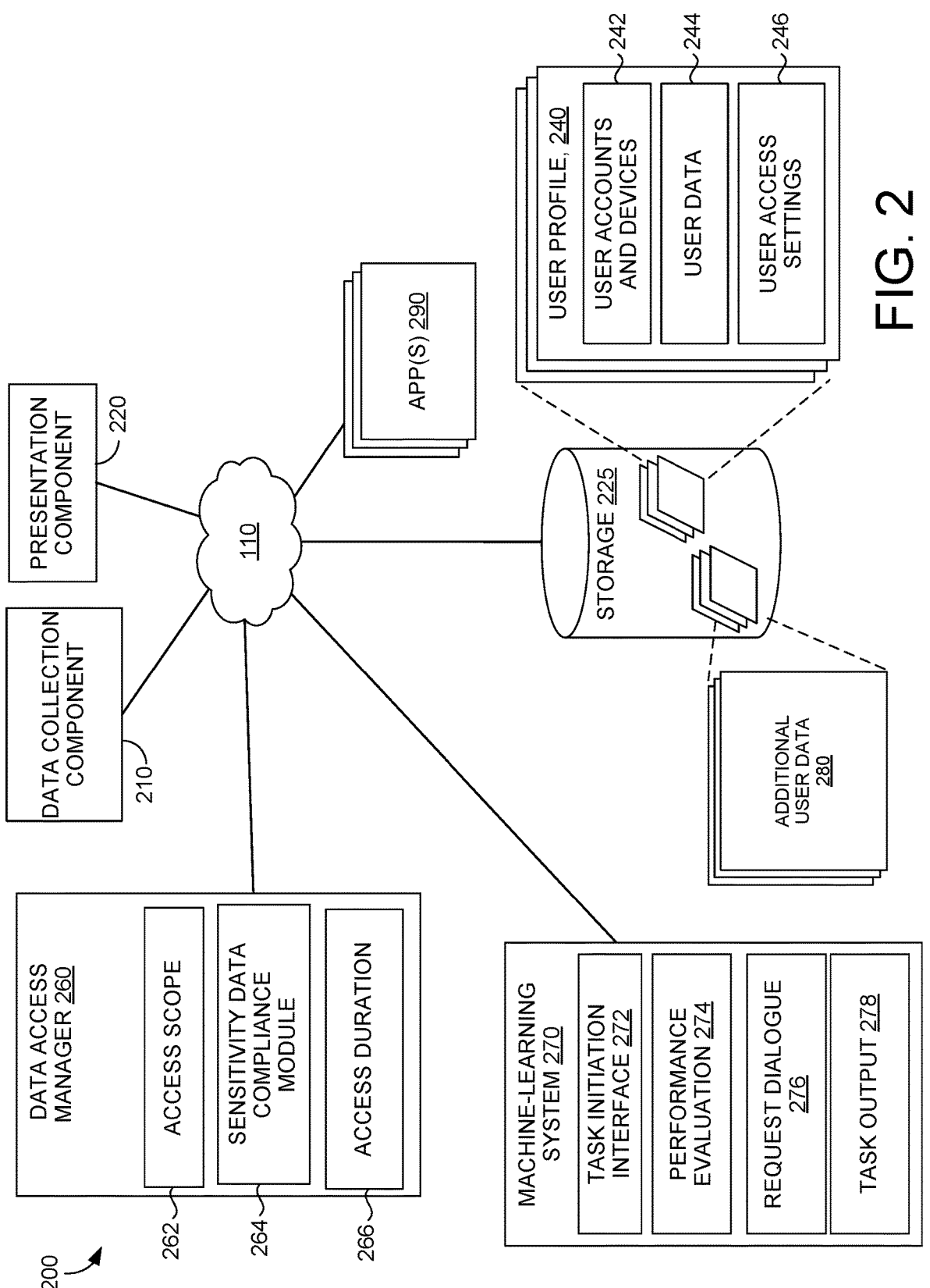
FIG. 2 is a diagram depicting an example computing architecture suitable for implementing aspects of the present disclosure.

Operating environment 100 can be utilized to implement one or more of the components of system 200, as described in FIG. 2, including components for accessing and collecting additional information from various sources; receiving user preferences and/or permissions for using the information through a privacy conversation interface, for generating a task response using the additional information; and presenting task responses. Operating environment 100 can also be utilized for implementing aspects of methods 600, 700, and 800 in FIGS. 6, 7, and 8, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements can be omitted altogether for the sake of clarity. Further, as with operating environment 100, many of the elements described herein are functional entities that are implemented as discrete or distributed components or in conjunction with other components, and in any suitable combination and location. In one example, the computing device 900 of FIG. 9 and the distributed computing device 1000 of FIG. 10 perform aspects of the system 200 of FIG. 2.

Example system 200 includes network 110, which is described in connection to FIG. 1, and which communicatively couples components of system 200, including data collection component 210, presentation component 220, data access manager 260, machine-learning system 270, end-user applications 290, and storage 225. Data access manager 260, machine-learning system 270, end-user applications 290, data collection component 210, and presentation component 220 may be embodied as compiled computer instructions or functions, program modules, computer software services, or an arrangement of processes carried out on one or more computer systems, such as distributed computing device 1000, described in connection to FIG. 10, for example.

In one embodiment, the functions performed by components of system 200 are associated with one or more computer applications, services, or routines, such as an online meeting application, a video-viewing application, a communications or collaboration application, a web browser, operating system, productivity software, personal assistant application, or an organizational explorer application. Moreover, certain components, functions performed by these components, or services carried out by these components are implemented at appropriate abstraction layer(s), such as the operating system layer, application layer, hardware layer, etc., of the computing system(s). Alternatively, or in addition, certain functionality of these components and/or the embodiments described herein is performed, at least in part, by one or more hardware logic components. For example, and without limitation, illustrative types of hardware logic components include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), and so forth. Additionally, although functionality is described herein with regard to specific components shown in example system 200, it is contemplated that in some embodiments, functionality of these components can be shared or distributed across other components.

Continuing with FIG. 2, data collection component 210 is generally configured to access or receive (and in some cases identify) data for use by the machine-learning system 270. The data collection component 210 may access public data, such as information in a knowledge base or non-access protected website. Public data is data that may be accessed by the public without special authorization or credential (e.g., password). Some user data may be public if posted on social media or websites. In aspects, the technology described herein may not make access requests for public data.

The data collection component 210 may also access enterprise data. Enterprise data is managed by an enterprise, such as a corporation, school, or government entity. The enterprise data may include work-related user data for employees, contractors, customers, and other entities associated with the enterprise. Enterprises may have a policy granting the machine-learning system access to sources of enterprise data, such as a document storage system, calendar system, corporate hierarchy and the like. This data may be described as available to the machine-learning system. In aspects, permission requests are not generated for available information.

Enterprises may give the machine-learning system conditional access to other information. The condition may be user permission from a user who is authorized to access the information. Information to which a user is able to grant the machine-learning system access may be described as enterprise user data. The enterprise user data need not describe the user or be directly related to the user. Instead, enterprise user data is enterprise data that the user is authorized to access and/or authorized to grant access to the machine-learning system.

The data collection component 210 may access personal user data. Personal user data is data managed by the person without reference to a second entity, such as an employer. Some personal user data may be associated with multiple people, such as every recipient of an email. The technology described herein may ask a user for authorization to access personal user data. The user data may include public user data, personal user data, and/or enterprise user data.

In one embodiment, user data includes data associated with a user, data associated with communication items, or any other suitable data made available via one or more data sources, such as data sources 104a and 104b through 104n of FIG. 1. In some embodiments, data collection component 210 is employed to facilitate the accumulation of data for the data access manager 260 or its subcomponents, the machine-learning system 270 or its subcomponents, or the end-user applications 290. In one embodiment, the data is received (or accessed), and optionally accumulated, reformatted, and/or combined, by data collection component 210 and stored in one or more data stores, such as storage 225, where it is available to other components of system 200. For example, the user data may be stored in or associated with a user profile 240, as described herein, such as in user-contextual data 244 of user profile 240, or is stored in or associated with the contextual item data 280, as described herein. In some embodiments, any personally identifying data (for example, user data that specifically identifies particular users) is either not uploaded or otherwise provided from the one or more data sources, is not permanently stored, is de-identified, and/or is not made available to other components of system 200, for example, as discussed with respect to the sensitivity data compliance module 264. In addition or alternatively, a user may opt into or out of services provided by the technologies described herein and/or select which user data and/or which sources of user data are to be captured and utilized by these technologies.

User data, in one example, comprises any information that is related to a person and that person's interactions. User data may be received from a variety of sources and available in a variety of formats. By way of example and without limitation, user data sources and/or formats comprises at least one of: audio information (for example, an audio file having a recording of sound and spoken content from a meeting); transcript information (for example, a document having text that has been extracted out of a meeting or video based on audio of the meeting or video and/or a chat during the meeting); contact information (for example, email, instant message, phone, and so forth associated with meeting attendees or meeting invitees, and can also specify a person's communication preferences); location information (for example, a person's current location or location of a particular office where they work); presence; user-related activity, which may comprise activity relevant to a user or group member, such as communication information (for example, past email, meetings, chat sessions, communication patterns or frequency, information about a user or other meeting attendees/invitees that the user had a meeting with or has an upcoming meeting with, or information about communications between a group member and one or more users), file access (for example, a file created, modified, or shared), social media or online activity, such as a post to a social media platform or website, subscription information, information regarding topics of interest to a user, or other user-related activity that may be determined via a user device (such as user device 102a of FIG. 1); task-related information (for example, an outstanding task that the user has with regard to a meeting or outstanding tasks that meeting attendees have with respect to the user); information about a group or group member that they may choose to share (for example, birthday, anniversary, etc.); or information in common with the user (for example, common project teams, work groups, backgrounds, education, interests, or hobbies). Additional examples of user data are described herein.

In some embodiments, user data received via data collection component 210 is obtained from a data source (such as data source 104a in FIG. 1, which is a meeting hosting site, a social networking site, a professional networking site, a corporate network, an organization's intranet or file share, or other data source containing user data) or determined via one or more sensors (such as sensors 103a and 107 of FIG. 1), which are on or associated with one or more user devices (such as user device 102a), servers (such as server 106), and/or other computing devices. In one example, a sensor includes a function, routine, component, or combination thereof for sensing, detecting, or otherwise obtaining information such as user data from a data source 104a, and is generally embodied as hardware, software, or both.

By way of example and not limitation, user data includes data that is sensed, detected, or determined from one or more sensors (referred to in one example as sensor data or user data), such as location information of mobile device(s), properties or characteristics of the user device(s), user-activity information (for example: app usage; online activity; searches; voice data such as automatic speech recognition; activity logs; communications data, including calls, texts, chats, messages, and emails; document comments or website posts; other user data associated with communication events (including user history, session logs, application data, contacts data, calendar and schedule data, notification data, social-network data, e-commerce activity, user-account(s) data [which may include data from user preferences or settings associated with a personalization-related application, a personal assistant application or service, an online service or cloud-based account such as Microsoft 365, an entertainment or streaming media account, a purchasing club or services]); global positioning system (GPS) data; other user device data (which may include device settings, profiles, network-related information, payment or credit card usage data, or purchase history data); other sensor data that is sensed or otherwise detected by a sensor (or other detector) component(s), including data derived from a sensor component associated with the user (including location, motion, orientation, position, user access, user activity, network-access, user-device charging, or other data that is capable of being provided by one or more sensor components); data derived based on other data (for example, location data that can be derived from Wi-Fi, cellular network, or internet protocol [IP] address data), and nearly any other source of data that is sensed, detected, or determined as described herein.

In some embodiments, user data, particularly in the form of context data or contextual information regarding a particular user, is received by data collection component 210 from one or more sensors and/or computing devices associated with the user. In some embodiments, components of system 200 determine interpretive data from received user data. Interpretive data corresponds to data utilized by the components or subcomponents of system 200 that comprises an interpretation from processing raw data, such as a transcript extracted from raw audio from the communication item, or topic information interpreted from a communication item, such as a chat of a meeting, a transcript, and so forth. In one example, interpretive data is used to provide context to user data, which generally supports determinations or inferences carried out by components of system 200. Moreover, it is contemplated that some embodiments of the disclosure utilize user data alone or in combination with interpretive data for carrying out the objectives of the subcomponents described herein. It is also contemplated that some user data is processed by the sensors or other subcomponents of data collection component 210 not shown, such as for interpretability by data collection component 210.

In some respects, user data is provided in user data streams or signals. A "signal" can be a feed or stream of user data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a calendar service, an email account, a credit card account, or other data sources. In some embodiments, data collection component 210 receives or accesses data continuously, periodically, as it becomes available, or as needed. In some embodiments, the user data, which includes data indicative of the user's interactions during a meeting or while streaming a recording of the meeting, and which is received by data collection component 210 is stored in storage 225, such as in user data 244 or additional data 280.

Example system 200 includes a presentation component 220 that is generally responsible for presenting content including a task initiation interface, permission interface, and task response interface. Certain content is presented via one or more presentation components 916, as described in FIG. 9. Example presentation component 220 comprises one or more applications or services on a user device across multiple user devices or in the cloud. In one embodiment, presentation component 220 manages the presentation of communication items with user-specific contextual titles to users across multiple user devices, such as a mobile device, laptop device, or virtual reality (VR) headset, and so forth. For example, presentation component 220 determines on which user device(s) content is presented and/or how much content is presented, presents the communication items with their corresponding contextual titles generated by the machine-learning system 270 and/or presents any data associated with any other components of system 200.

Figure 3:
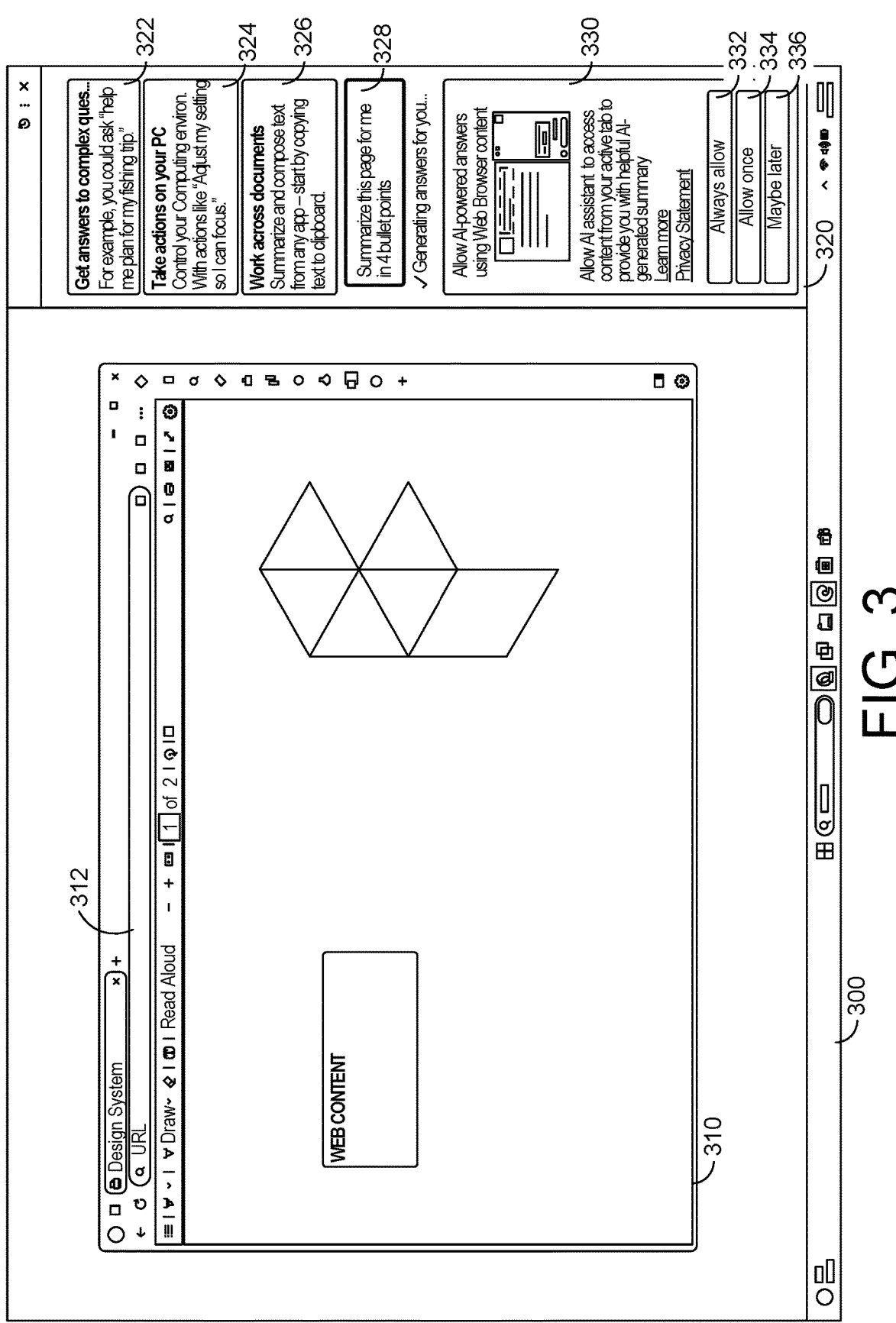
FIG. 3 is a diagram of a machine-learning interface for requesting a task, according to an aspect of the present disclosure.

Embodiments of the presentation component 220 present information, via a graphical user interface ("GUI"), in a number of different formats and applications, such as those shown in FIG. 3. Such elements can include icons or indicators, graphics buttons, sliders, menus, audio prompts, alerts, alarms, vibrations, pop-up windows, notification bar or status bar items, in-app notifications, queries, prompts, or other similar features for interfacing with a user.

Turning now to FIG. 3, an example computer display 300 with the machine-learning interface 320 is shown, according to aspects of the technology described herein. The computer interface 300 includes a browser 310 displaying a webpage from the URL 312. The machine-learning interface 320 is shown in the sidebar to the right. The machine-learning interface 320 includes three task-initiation request suggestions. The answer-suggestion interface 322 allows the user to open a query box through which the user may communicate a question. The system-control interface 324 may generate a dialogue interface through which the user may control configurable settings on the computing device generating the computer interface 300. The summary interface 326 invites the user to designate content that may be summarized by the machine learning system. Content that may be summarized includes documents, emails, webpages, social media posts, and the like. A specific task initiation request 328 asks the machine learning system to summarize the webpage content in four bullet points.

The example access request 330 asks the user for permission to access content in the web browser 310. In some instances, the system may have technical access to the content in the web browser 310 before the access request 330 is output. Technical access may mean that the system may access the content without an additional security process (e.g., providing a user name, password, token). Asking for permission via a request emphasizes to the user that content from the web browser 310 will be transferred to the machine-learning system for processing. The user is given the option of always allowing access 332, allowing the access once 334, or denying the access 336.

Figure 4:
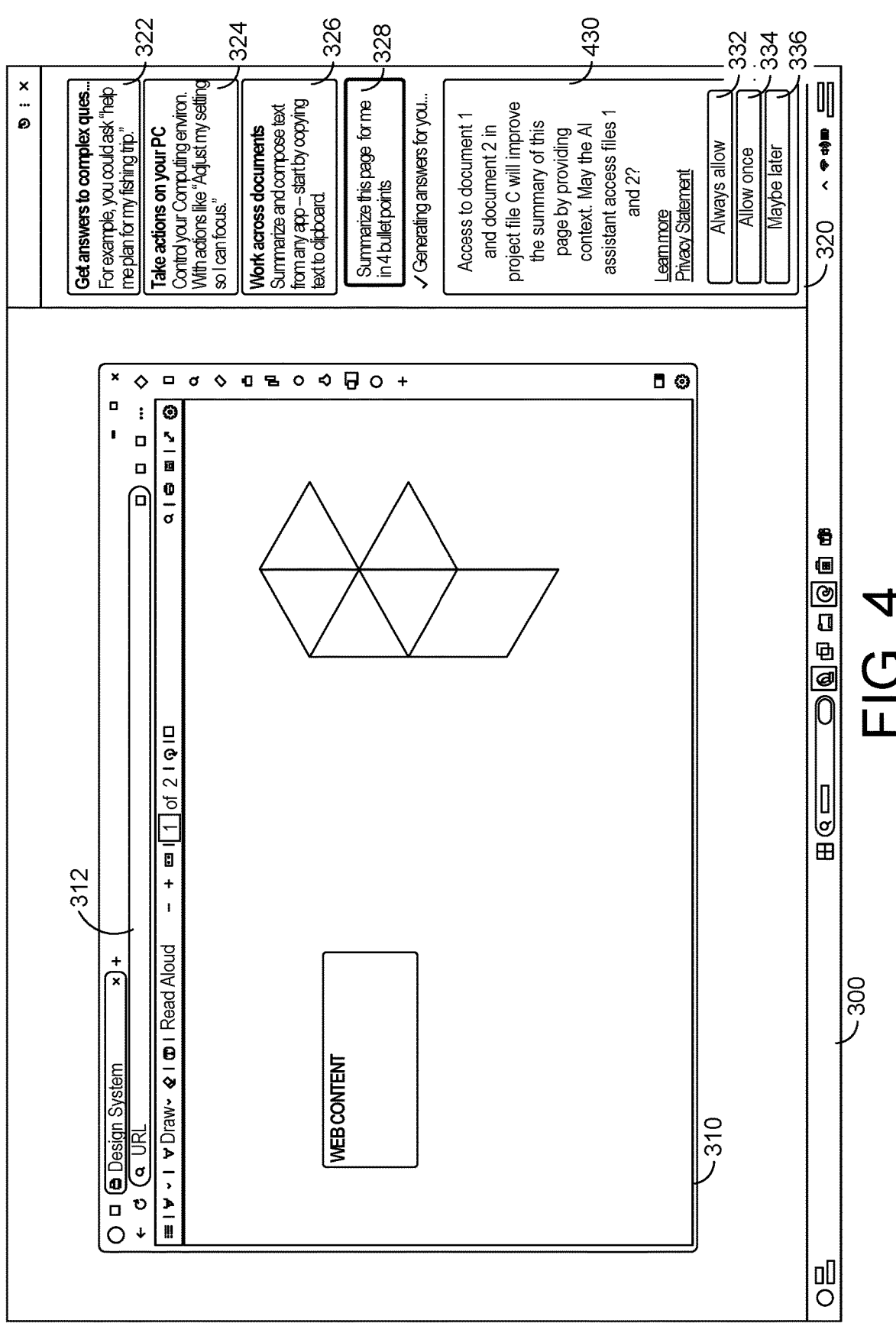
FIG. 4 is a diagram of a machine-learning interface for seeking access to additional user data, according to an aspect of the present disclosure.

FIG. 4 shows an example computer display 300 with the machine-learning interface 320 requesting access to additional information, according to aspects of the technology described herein. The access request 430 explains that access to two additional documents will improve the summary being generated. As mentioned, the access request 430 could be generated after determining that a quality measure for a summary generated without the additional information will fall below a threshold criteria. The access request 430 identifies specific content to be accessed, rather than a general request for documents. Though not shown, the request could also specify a requested duration of access. The documents requested could be identified because of similarities with the content being summarized.

FIG. 5 shows an example computer display 300 with the machine-learning interface 320 showing an output generated with additional information, according to aspects of the technology described herein. The output 510 is a four point summary of the content in the web browser 310. The completion message 530 explains that the summary was generated using content from the requested documents.

Continuing with FIG. 2, machine-learning system 270 performs a task for a user. The machine-learning system 270 includes a task-initiation interface 272, performance evaluation 274, request dialogue 276, and task output interface 278. The machine-learning model may include a large-language model (LLM) (not shown) and/or multi-modal generative model(s). LLMs are machine-learning models that use deep learning algorithms to process and understand natural language. These models are trained on large amounts of text data to learn patterns and entity relationships in the language. They can understand complex textual data, identify entities and relationships between them, and generate new text that is coherent and grammatical. The LLM may be one of several available models, such as ChatGPT (Generative Pre-trained Transformer), GPT-3, GPT-4, Bidirectional Encoder Representations from Transformers (BERT), and BigScience Large Open-science Open-access Multilingual (BLOOM). Multi-modal generative models may process data in multiple modalities, such as language and vision. The machine-learning system 270 can perform many types of language tasks, such as translating languages, analyzing sentiments, content creation, speech recognition, text generation, classification, knowledge retrieval, dialog generation, and more.

The task-initiation interface 272 receives a task initiation request. In one aspect, the task initiation request is a prompt submitted to the machine-learning system 270. A prompt may include instructions or queries entered to elicit a response from the machine-learning system 270. A prompt may include keywords and phrases meant to spark a reply. The machine-learning system 270 may respond in a conversational manner. In another aspect, the task initiation request is the selection of pre-proposed tasks through the machine-learning systems interface. Examples of pre-proposed tasks were provided in FIG. 3. The proposed task could be a sentiment analysis of a webpage and/or summary of a webpage.

The performance evaluation component 274 determines whether additional information will improve a quality of the task response. Several methods of determining whether additional user information will improve the task response are contemplated. The methods may be performed individually or in combination. One method is to ask the machine-learning system whether additional information will improve a quality of the task response. The machine-learning system may be questioned using an automatically generated prompt. The prompt may be automatically generated using a natural language processor that re-phrases the task request and asks about additional information. The prompt may also ask for a specific description of the information that will improve the quality of the task response. The prompt may ask for a limited description that attempts to describe information that will help improve the quality of the response without including significant amounts of information that will not help with the response.

Another method is to let the machine-learning model generate a response to the task using available information and then evaluate the quality of the response. In one aspect, the machine-learning model generates a quality measure with each response. The confidence factor may be used as a quality measure. When the quality measure (e.g., confidence factor) falls below a threshold range, then additional information may be sought.

Another method is to train a second machine-learning model to determine whether additional information will improve a response quality. Poor quality task requests may correlate to poor quality task responses generated by the language model. The second machine-learning model may be trained using labeled task requests. The task requests may be labeled as needing additional information or adequate. If needing more information, then the label may specify a category of additional information that may help. In this way, the second machine-learning model may be able to determine when additional information will improve a task response.

The request dialogue component 276 generates an access request in response to determining that additional user data will improve a quality of the task response. The access request may be output through the presentation component 220. The access request may indicate a user data to be accessed and/or source of data. The access request may also specify a duration for which the access is to be granted. In an aspect, the user may accept or deny the request.

The request dialogue component 276 may use the machine-learning system to engage in a dialogue with the user about granting access to the user data. For example, the request dialogue component 276 may receive and respond to user questions about the access to be granted. The user may also modify a request through the dialogue. For example, an initial request may be for access to emails sent from a first email address over the last month. In response, the user may communicate that access is granted to email sent from the first email address over the last two weeks instead. The dialogue component 276 may then modify the access request to specify a two-week duration and seek confirmation.

The task output interface 278 provides the task response to the user. In aspects, the task response is generated using the additional user data to which access was granted.

Continuing with FIG. 2, data access manager 260 determines the scope for a data access request and the duration of the access. The data access manager 260 includes an access scope component 262, Sensitivity data compliance module 264, and an access duration component 266.

The access scope component 262 determines an access scope for the request for additional information. A goal of the access scope component 262 is to request access limited to information that will help generate a high quality task response. The access scope component 262 can evaluate an initial access request generated by the machine-learning system 270 or another component of the system and identify characteristics the requested user data has in common in common. For example, emails from certain users could be requested, rather than access to an inbox or email archive.

Sensitivity data compliance module 264, in general, is responsible for determining whether requested additional information might have sensitive content. In one example, determining whether additional information has sensitive content is based on a sensitivity policy. In one example, "sensitive content" refers to data that should be guarded from unauthorized access or unwarranted disclosure to maintain the information security of an individual, entity, or organization. Example sensitive content includes personally identifiable information (PII), such as educational information, financial information (for example, credit card numbers, banking information, tax forms, and credit reports); business information, such as intellectual property, trade secrets, consumer and supplier records, and plans for a merger; or classified information, such as government data, and the like. Sensitive content may be contained in audio or visual content (for example, a video, a document, an image, or any other tangible media) displayed during a meeting. In one embodiment, sensitive content is defined by a corporate, organizational, enterprise, state, or federal sensitivity policy that is accessed to determine sensitive content that the meeting presentation may contain. As discussed herein, in one example, a "sensitivity policy" refers to at least one of a corporate, organizational, enterprise, state, federal sensitivity policy, or any suitable set of rules defining management of information.

After the machine-learning system 270 identifies target additional user data, embodiments of the sensitivity data compliance module 264 determine whether the target additional user data includes sensitivity content. The determination that helpful additional user data may be sensitive may trigger a request for permission. In aspects, information deemed non-sensitive may be accessed according to a default access policy without generating a new permission request.

In embodiments, the sensitivity data compliance module 264 identifies sensitive data in additional user data and modifies the data before it is communicated to the machine-learning system 270. The modification can include using representative tokens to replace the data instance from the sensitive content. For example, suppose a regional sensitivity policy prohibits the distribution of personal identification information, such as a birthday. In this example, the sensitivity data compliance module 264 would identify data instances indicative of a birthdate, such as "born in Mar. 19, 1994," and replace with a representative token such as "<date>," "<sensitive,>" or any generic description that does not contain sensitive content.

An access duration component 266 determines a duration for which access to additional user data should be granted. The duration may be specified in the request. In general, the duration should be limited to an amount needed to complete a requested task. Example durations can be single use, browsing session, a boot cycle, a day, a week, a month, a year, and the like. In one aspect, different types of requests are associated with different durations using heuristics. For example, if the request is accessing content in a browser for the purpose of summarization, then the duration could be for a browsing session.

Continuing with FIG. 2, example system 200 includes one or more end-user application(s) 290, which the machine-learning system 270 may interact with to perform a task. For example, the machine-learning system 270 may interact with a web browser application to answer a question related to content shown in the web browser. Examples of end-user application(s) 290 include, without limitation, spreadsheet applications, presentation applications, word processor applications, business applications, web browser applications, e-reading applications, calendar applications, project management applications, email applications, social media applications, database applications, accounting software, and the like. Applicants 290 may be a source of additional information. Accordingly, a request for additional information may be for access to application information associated with the user. In one example, the application information is web page content shown in a browser. In another, the additional information is content of a document in a word processor application.

Example system 200 of FIG. 2 also includes storage 225. Storage 225 generally stores information including data, computer instructions (for example, software program instructions, routines, or services), profiles, and/or models used in embodiments described herein. In an embodiment, storage 225 comprises a data store (or computer data memory). Further, although depicted as a single data store component, storage 225 may be embodied as one or more data stores or in the cloud.

As shown in example system 200, storage 225 includes an example embodiment of a user profile 240 and additional user data 280. Example user profile 240 includes information about it user accounts devices 242, user data 244, and user configurations/settings 246, including preferences for authorizing access to user data. In some embodiments, the information stored in user profile 240 is available to other components of example system 200.

User accounts and devices 242 generally include information about user devices accessed, used, or otherwise associated with a user, and/or information related to user accounts associated with the user, which may be used for accessing or collecting user data for a user. For example, information of user accounts and devices 242 comprises at least one of: online or cloud-based accounts (for example, email or social media) such as a Microsoft® MSA account or a Microsoft® 365 account; other accounts such as entertainment or gaming-related accounts (for example, Xbox®, Netflix®, online game subscription accounts, or similar account information); people data that relates to such accounts, such as user emails, texts, instant messages, calls, other communications, and other content; social network accounts and data, such as news feeds; online activity; and calendars, appointments, application data, other user accounts, or the like. Some embodiments of user accounts and devices 242 store information across one or more databases, knowledge graphs, or data structures. As described previously, the information stored in user accounts and devices 242 may be determined from communication data collection component 210.

As described previously, user data 244 generally includes information about a user and/or corresponding communication items associated with the user profile 240. In one embodiment, user data 244 includes user data received from data collection component 210, which includes user-related activity data, a context or contextual information, and user data features (or structured or semi-structured user data), in some embodiments. User data 244 also may include information regarding communication items, such as a transcript of spoken content delivered during the meeting, a chat transcript of messages exchanged privately or publicly during the meeting, and other examples discussed herein and the like. Example user data 244 also includes information regarding the user's interactions with one or more communication items, such as the number of interactions, frequency, or other data regarding the interactions the user had during the meeting that are relevant to the user.

User configurations/settings 246 generally include user settings or preferences associated with embodiments described herein. By way of example and not limitation, such settings include user configurations or preferences about the various thresholds described herein, confidence values associated with inferences, explicitly defined settings regarding user data used to complete a requested task.

Example additional user data 280, in general, comprises additional information to which the user granted the machine-learning system access. For example, copies of emails accessed for the purpose of sentiment analysis or summary may be stored for the duration authorized by the user as part of the request or for a default duration (e.g., six hours). An interface may be provided for the user to view and/or delete additional user data 280. After the duration passes, the corresponding additional user data 280 may be deleted from the storage 225. The deletion in the storage 225 may not cause deletion of the source user data used to generate the additional user data 280. For example, if the additional user data is emails copied from an inbox, then deletion from the storage 225 would not change the emails still in the inbox. Additionally or alternatively, user data 280 may take the form of access grants. For example, in some aspects, additional information is not copied into the storage 225 and is instead analyzed by the machine-learning system 270 from the original source location to which access is granted. The access grant may be deleted upon a duration of the grant passing.

Figure 7:
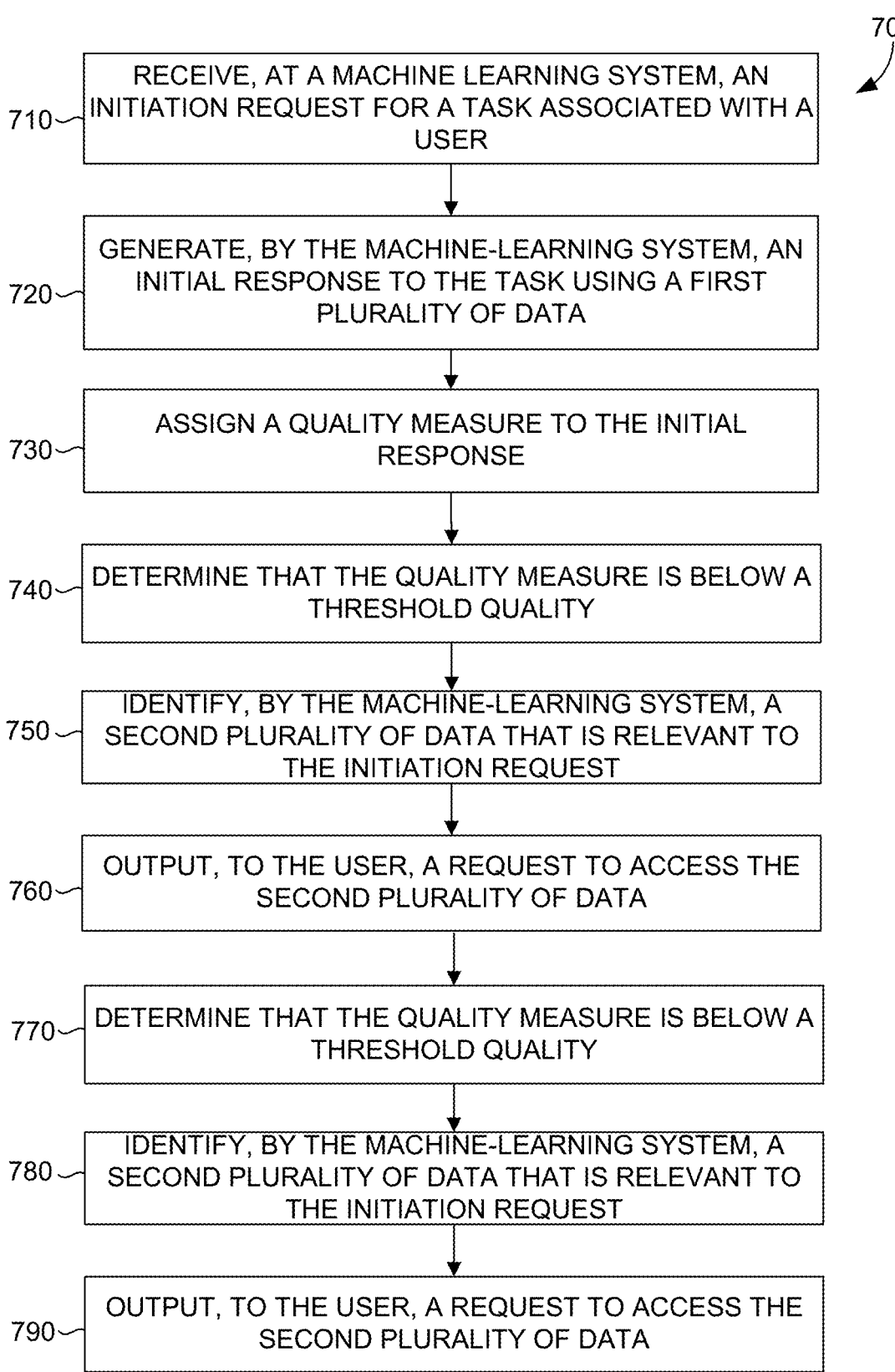
FIG. 7 is a flow chart showing a method of managing input to a machine-learning system, according to an aspect of the present disclosure.

Now referring to FIGS. 6, 7 and 8, each block of methods 600, 700, and 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 600, 700, and 800 are described, by way of example, with respect to FIGS. 1-3. However, these methods may additionally or alternatively be executed by any one system, or any combination of systems, including, but not limited to, those described herein.

FIG. 6 is a flow diagram showing a method 600 of securing input data used by a machine-learning system, in accordance with some embodiments of the present disclosure. Method 600 may be performed on or with systems similar to those described with reference to FIGS. 1-3. At step 610, method 600, includes receiving, at a machine-learning system, an initiation request for a task associated with a user. The task initiation request can take several forms. In one aspect, the initiation request is a natural language prompt provided by a user. For example, the user may type or speak a request. In another example, the task initiation request is an automatic task-initiation suggestion, as illustrated in FIG. 3.

At step 620, method 600, includes determining, by the machine-learning system, that additional user data has above a threshold probability of improving a response to the task. Several methods of determining whether additional user information will improve the task response are contemplated. One method is to ask the machine-learning system whether additional information will improve a quality of the task response. The machine-learning system may be questioned using an automatically generated prompt. The prompt may be automatically generated using a natural language processor that re-phrases the task request and asks about additional information. The prompt may also ask for a specific description of the information that will improve the quality of the task response. The prompt may ask for a limited description that attempts to describe information that will help improve the quality of the response without including significant amounts of information that will not help with the response.

At step 630, method 600, includes determining that the additional user data satisfies a sensitivity criteria. In one example, determining whether additional user data has satisfies a sensitivity criteria is based on a sensitivity policy. In one example, "sensitive content" refers to data that should be guarded from unauthorized access or unwarranted disclosure to maintain the information security of an individual, entity, or organization. Example sensitive content includes personally identifiable information (PII), such as educational information, financial information (for example, credit card numbers, banking information, tax forms, and credit reports); business information, such as intellectual property, trade secrets, consumer and supplier records, and plans for a merger; or classified information, such as government data, and the like. Sensitive content may be contained in audio or visual content (for example, a video, a document, an image, or any other tangible media) displayed during a meeting. In one embodiment, sensitive content is defined by a corporate, organizational, enterprise, state, or federal sensitivity policy that is accessed to determine sensitive content that the meeting presentation may contain. As discussed herein, in one example, a "sensitivity policy" refers to at least one of a corporate, organizational, enterprise, state, federal sensitivity policy, or any suitable set of rules defining management of information.

At step 640, method 600, includes outputting, to the user, a request to access the additional user data. The request may identify the additional user and explain that providing access to the additional user data may improve the task response. Example access requests have been described previously, for example, with reference to FIGS. 3-5. At step 650, method 600, includes receiving, from the user, permission to access the additional user data. The access request may include permission selection interfaces through which the user may grant or deny access to the additional user data. Upon the user selecting an interface component granting permission, the machine learning system is notified that permission is granted. In some embodiments, the user may need to provide a security credential(s) to provide access to the additional user data. In such embodiments, the user access request may include a request for credentials and the supplied credentials are provided with the permission and/or in addition to the permission.

At step 660, method 600, includes accessing the additional user data. Method At step 670, method 600, includes generating the response to the task using the additional user data. In addition to the content, other content, such as publicly available content or content the user previously granted access to, may be used to generate the response. For example, any data used to generate the initial response may be also be used to generate the final response.

FIG. 7 is a flow diagram showing a method 700 of securing input data used by a machine-learning system, in accordance with some embodiments of the present disclosure. Method 700 may be performed on or with systems similar to those described with reference to FIGS. 1-3. At step 710, method 700 includes receiving, at a machine-learning system, an initiation request for a task associated with a user. The task initiation request can take several forms. In one aspect, the initiation request is a natural language prompt provided by a user. For example, the user may type or speak a request. In another example, the task initiation request is an automatic task-initiation suggestion, as illustrated in FIG. 3.

At step 720, method 700 includes generating, by the machine-learning system, an initial response to the task using a first plurality of data. At step 730, method 700 includes assigning a quality measure to the initial response. In one aspect, the machine-learning system, evaluates the quality of the response. In one aspect, the machine-learning model generates a quality measure with each response. The confidence factor may be used as a quality measure. When the quality measure (e.g., confidence factor) falls below a threshold range, then additional information may be sought.

Another method is to train a second machine-learning model to determine whether additional information will improve a response quality. Poor quality task requests may correlate to poor quality task responses generated by the language model. The second machine-learning model may be trained using labeled task requests. The task requests may be labeled as needing additional information or adequate. If needing more information, then the label may specify a category of additional information that may help. In this way, the second machine-learning model may be able to determine when additional information will improve a task response. At step 740, method 700 includes determining that the quality measure is below a threshold quality. This may involve comparing the quality measure to the threshold quality.

At step 750, method 700 includes identifying, by the machine-learning system, a second plurality of data that is relevant to the initiation request. In one aspect, the second plurality is identified by generating a prompt and asking the machine-learning system what type of information would improve the response quality. The machine-learning system may not be able to identify specific information that actually exists when formulating an answer, but only categories of information that might help. For example, the machine-learning may not be aware that an email of April $4^{th}$ will improve the answer summarizing a project until it has access to the user's emails. Nevertheless, the answer provided by the machine learning system may request access to the user emails because project details are often discussed via email.

Once access is granted, the emails most relevant to the project may be identified and used.

At step 760, method 700 includes outputting, to the user, a request to access the second plurality of data. The request may identify the additional user and explain that providing access to the additional user data may improve the task response. Example access requests have been described previously, for example, with reference to FIGS. 3-5.

At step 770, method 700 includes receiving, from the user, permission to access the second plurality of data. The access request may include permission selection interfaces through which the user may grant or deny access to the second plurality of data. Upon the user selecting an interface component granting permission, the machine learning system is notified that permission is granted. In some embodiments, the user may need to provide a security credential(s) to provide access to the second plurality of data. In such embodiments, the user access request may include a request for credentials and the supplied credentials are provided with the permission and/or in addition to the permission.

At step 780, method 700 includes accessing the second plurality of data. At step 790, method 700 includes generating, by the machine-learning system, a final response to the task using the second plurality of data. In addition to the content, other content, such as publicly available content or content the user previously granted access to, may be used to generate the response. For example, the first plurality of data may also be used to generate the response.

FIG. 8 is a flow diagram showing a method 800 of securing input data used by a machine-learning system, in accordance with some embodiments of the present disclosure. Method 800 may be performed on or with systems similar to those described with reference to FIGS. 1-3. At step 810, method 800, includes receiving, at a machine-learning system, an initiation request for a task associated with a user. The task is related to content from an application that is not associated with the machine-learning system as input. The task initiation request can take several forms. In one aspect, the initiation request is a natural language prompt provided by a user. For example, the user may type or speak a request. In another example, the task initiation request is an automatic task-initiation suggestion, as illustrated in FIG. 3.

At step 820, method 800, includes outputting, to the user, a request to access the content from the application. The request may identify the additional user and explain that providing access to the additional user data may improve the task response. Example access requests have been described previously, for example, with reference to FIGS. 3-5.

At step 830, method 800, includes receiving, from the user, permission to access the content. The access request may include permission selection interfaces through which the user may grant or deny access to the content. Upon the user selecting an interface component granting permission, the machine learning system is notified that permission is granted. In some embodiments, the user may need to provide a security credential(s) to provide access to the content. In such embodiments, the user access request may include a request for credentials and the supplied credentials are provided with the permission and/or in addition to the permission.

At step 840, method 800, includes accessing the content. At step 850, method 800, includes generating a response to the task using the content. In addition to the content, other content, such as publicly available content or content the user previously granted access to, may be used to generate the response.

Example Computing Environments

Figure 9:
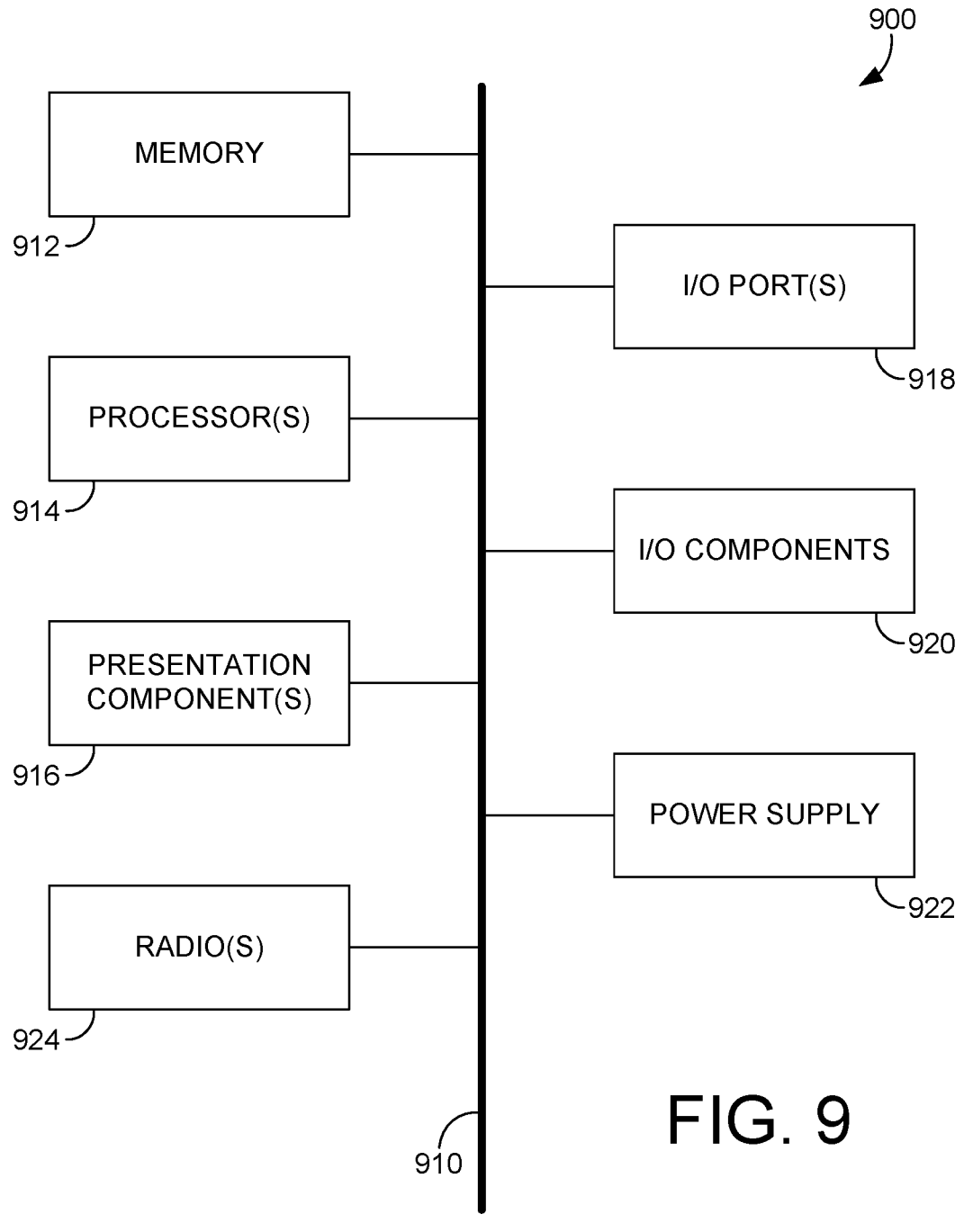
FIG. 9 is a block diagram of an example computing environment suitable for use in implementing an embodiment of the present disclosure.
Figure 10:
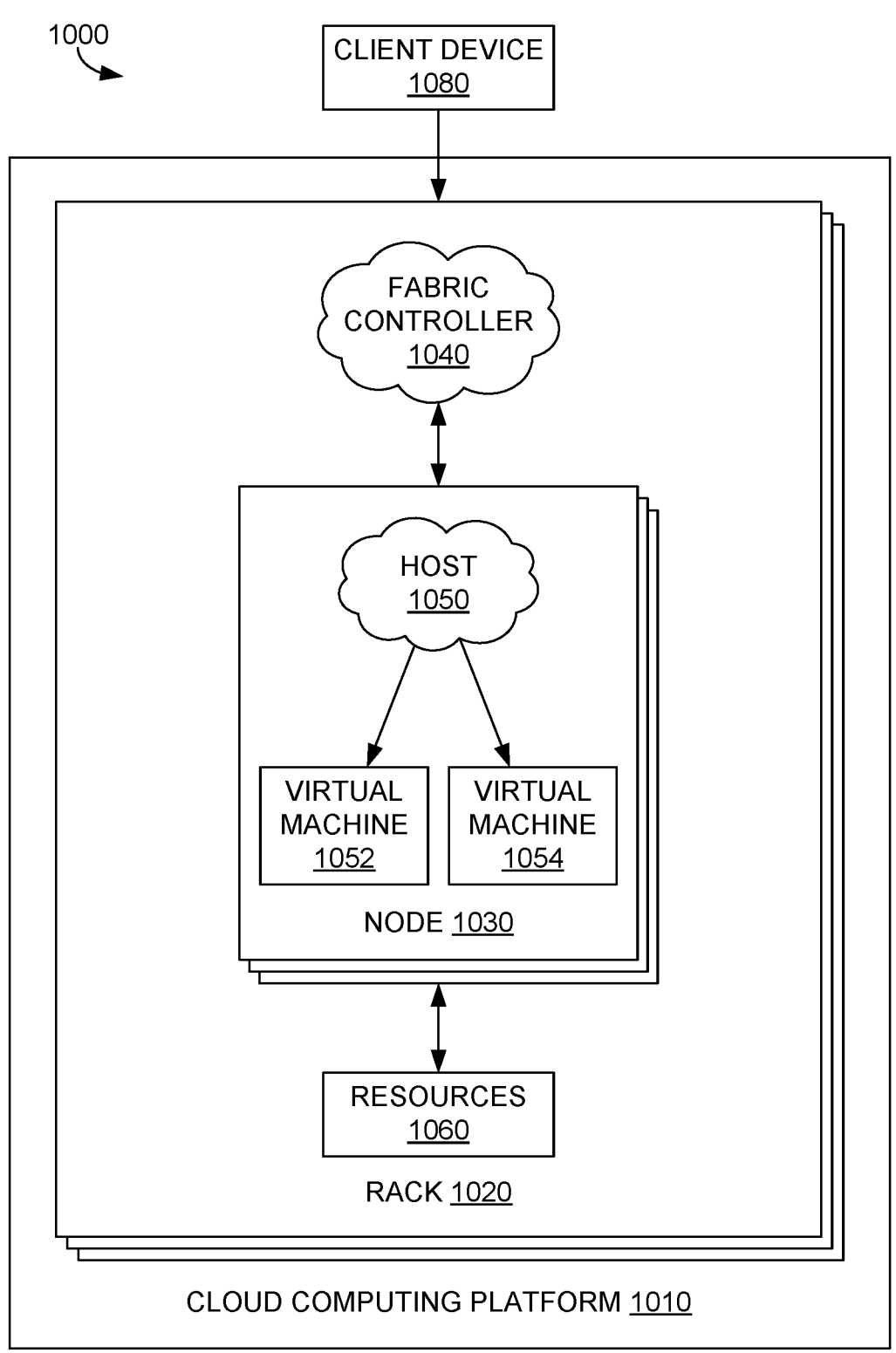
FIG. 10 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 9 and 10, respectively. With reference to FIG. 9, an example computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated with the embodiments of the present disclosure.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. In one example, bus 910 represents one or more buses (such as an address bus, data bus, or combination thereof). Although the various blocks of FIG. 9 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 9 is merely illustrative of an example computing device that can be used in connection with one or more embodiments of the present disclosure. Distinction is not made between such categories as "workstation," "server," "laptop," or "handheld device," as all are contemplated within the scope of FIG. 9 and with reference to "computing device."

Computing device 900 typically includes a variety of computer-readable media. Computer-readable media can be any available media that can be accessed by computing device 900 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 912 includes computer storage media in the form of volatile and/or non-volatile memory. In one example, the memory is removable, non-removable, or a combination thereof. Hardware devices include, for example, solid-state memory, hard drives, and optical-disc drives. Computing device 900 includes one or more processors 914 that read data from various entities such as memory 912 or I/O components 920. As used herein and in one example, the term processor or "a processer" refers to more than one computer processor. For example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor are performed by more than one processor.

Presentation component(s) 916 presents data indications to a user or other device. Presentation components include, for example, a display device, speaker, printing component, vibrating component, and the like.

The I/O ports 918 allow computing device 900 to be logically coupled to other devices, including I/O components 920, some of which are built in. Illustrative components include a microphone, joystick, game pad, satellite dish, scanner, printer, or a wireless device. The I/O components 920 can provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. In one example, the computing device 900 is equipped with depth cameras, such as stereoscopic camera systems, infrared camera systems, red-green-blue (RGB) camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 include one or more radio(s) 924 (or similar wireless communication components). The radio transmits and receives radio or wireless communications. Example computing device 900 is a wireless terminal adapted to receive communications and media over various wireless networks. Computing device 900 may communicate via wireless protocols, such as code division multiple access ("CDMA"), Global System for Mobile ("GSM") communication, or time division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of Code-Division Multiple Access (CDMA), General Packet Radio Service (GPRS), Global System for Mobile Communication (GSM), Time-Division Multiple Access (TDMA), and 802.16 protocols.

Referring now to FIG. 10, an example distributed computing environment 1000 is illustratively provided, in which implementations of the present disclosure can be employed. In particular, FIG. 10 shows a high level architecture of an example cloud computing platform 1010 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1000 that includes cloud computing platform 1010, rack 1020, and node 1030 (for example, computing devices, processing units, or blades) in rack 1020. The technical solution environment can be implemented with cloud computing platform 1010, which runs cloud services across different data centers and geographic regions. Cloud computing platform 1010 can implement the fabric controller 1040 component for provisioning and managing resource allocation, deployment, upgrade, and management of cloud services. Typically, cloud computing platform 1010 acts to store data or run service applications in a distributed manner. Cloud computing platform 1010 in a data center can be configured to host and support operation of endpoints of a particular service application. In one example, the cloud computing platform 1010 is a public cloud, a private cloud, or a dedicated cloud.

Node 1030 can be provisioned with host 1050 (for example, operating system or runtime environment) running a defined software stack on node 1030. Node 1030 can also be configured to perform specialized functionality (for example, computer nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a multi-tenant infrastructure or tenancy. The terms "service application," "application," or "service" are used interchangeably with regards to FIG. 10, and broadly refer to any software, or portions of software, that run on top of, or access storage and computing device locations within, a datacenter.

When more than one separate service application is being supported by nodes 1030, certain nodes 1030 are partitioned into virtual machines (for example, virtual machine 1052 and virtual machine 1054). Physical machines can also concurrently run separate service applications. The virtual machines or physical machines can be configured as individualized computing environments that are supported by resources 1060 (for example, hardware resources and software resources) in cloud computing platform 1010. It is contemplated that resources can be configured for specific service applications. Further, each service application may be divided into functional portions such that each functional portion is able to run on a separate virtual machine. In cloud computing platform 1010, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 1080 is linked to a service application in cloud computing platform 1010. Client device 1080 may be any type of computing device, such as user device 102*n* described with reference to FIG. 1, and the client device 1080 can be configured to issue commands to cloud computing platform 1010. In embodiments, client device 1080 communicates with service applications through a virtual Internet Protocol (IP) and load balancer or other means that direct communication requests to designated endpoints in cloud computing platform 1010. Certain components of cloud computing platform 1010 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., nonsequential) collection of objects (or elements), such as machines (for example, computer devices), physical and/or logical addresses, graph nodes, graph edges, functionalities, and the like. As used herein, a set may include N elements, where N is any positive integer. That is, a set may include $1, 2, 3, \ldots N$ objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers $\mathbb{N}$ ). The objects included in other sets may be continuous objects (for example, the set of real numbers $\mathbb{R}$ ). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment; however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are contemplated without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer system, comprising:

a plurality of processors; and computer memory having computer-readable instructions embodied thereon, that, when executed by the plurality of processors, perform operations comprising:

receiving, at a machine-learning system, an initiation request for a task associated with a user;

determining, by the machine-learning system, that additional user data has above a threshold probability of improving a response to the task, wherein the response is to be generated by the machine-learning system;

determining that the additional user data satisfies a sensitivity criteria, wherein the sensitivity criteria is defined in a sensitivity policy and applies to a subset of user data;

outputting, to the user, a request to access the additional user data;

receiving, from the user, permission to access the additional user data;

accessing the additional user data; and generating, by the machine-learning system, the response to the task using the additional user data.

2. The system of claim 1, wherein the determining, by the machine-learning system, that the additional user data has above the threshold probability of improving the response to the task comprises determining that a quality measure associated with an initial task response generated by the machine-learning system is outside of a threshold range.

3. The system of claim 1, wherein the determining, by the machine-learning system, that the additional user data has above the threshold probability of improving the response to the task comprises:

automatically generating a prompt asking whether additional user data would improve the response to the task;

communicating the prompt to the machine-learning system; and receiving an answer to the prompt indicating that additional user data would improve the response to the task.

4. The system of claim 1, wherein the determining, by the machine-learning system, that the additional user data has above the threshold probability of improving the response to the task comprises:

communicating the request to a second machine-learning model trained to determine whether additional user data improves task responses; and receiving a second response from the second machine-learning model indicating that the additional user data would improve the response to the task.

5. The system of claim 1, wherein the machine-learning system is able to access the additional user data without receiving the permission.

6. The system of claim 1, wherein the task is a query.

7. The system of claim 1, wherein the machine-learning system comprises a large language model.

8. A computer-implemented method, comprising:

receiving, at a machine-learning system, an initiation request for a task associated with a user, wherein the task is to be completed by the machine-learning system;

generating, by the machine-learning system, an initial response to the task using a first plurality of data;

assigning, by the machine-learning system, a quality measure to the initial response;

determining, by the machine-learning system, that the quality measure assigned to the initial response generated by the machine-learning system is below a threshold quality;

identifying, by the machine-learning system, a second plurality of data that is relevant to the initiation request, wherein the second plurality of data is identified by:

automatically generating a prompt asking whether additional user data would improve the response to the task;

communicating the prompt to the machine-learning system; and receiving an answer to the prompt indicating the second plurality of data would improve the response to the task;

outputting, to the user, a request to access the second plurality of data;

receiving, from the user, permission to access the second plurality of data;

accessing, by the machine-learning system, the second plurality of data; and generating, by the machine-learning system, a final response to the task using the second plurality of data.

9. The computer-implemented method of claim 8, wherein the task uses content from an application that is not associated with the machine-learning system as input.

10. The computer-implemented method of claim 9, wherein the machine-learning system is associated with an operating system on which the application is running.

11. The computer-implemented method of claim 8, wherein the initiation request is a prompt for the machine-learning system.

12. The computer-implemented method of claim 8, wherein the quality measure is generated by a machine-classifier.

13. The computer-implemented method of claim 8, wherein the task is a sentiment analysis of electronic communications.

14. The computer-implemented method of claim 8, wherein the machine-learning system comprises a large language model.

15. Computer storage media having computer-executable instructions embodied thereon, that, when executed by at least one computer processor, cause computing operations to be performed, the operations comprising:

receiving, at a machine-learning system, an initiation request for a task associated with a user, wherein the task uses content from an application that is not accessible by the machine-learning system as input, and wherein the task is to be completed by the machine-learning system;

outputting, to the user, a request to access the content from the application wherein the request identifies the content as additional user data and the additional user data will improve a response to the task;

receiving, from the user, permission to access the content;

accessing the content; and generating, at the machine-learning system, the response to the task using the content.

16. The computer storage media of claim 15, wherein the machine-learning system is associated with an operating system on which the application is running.

17. The computer storage media of claim 15, wherein the operations further comprise:

automatically generating a prompt asking whether the additional user data would improve the response to the task;

communicating the prompt to the machine-learning system; and receiving an answer to the prompt indicating that the additional user data would improve the response to the task.

18. The computer storage media of claim 17, wherein the machine-learning system comprises a large language model.

19. The computer storage media of claim 17, wherein the task is a query.

\* \* \* \* \*